June 16, 1936. L. A. GILMAN Re. 20,006

TRAFFIC CONTROL DEVICE

Original Filed Nov. 3, 1932 2 Sheets-Sheet 1

Lyle A. Gilman Inventor

By C. A. Snow & Co.

Attorneys.

June 16, 1936. L. A. GILMAN Re. 20,006

TRAFFIC CONTROL DEVICE

Original Filed Nov. 3, 1932 2 Sheets-Sheet 2

Lyle A. Gilman Inventor

By C. A. Snow & Co.

Attorneys.

Reissued June 16, 1936

Re. 20,006

UNITED STATES PATENT OFFICE 20,006

TRAFFIC CONTROL DEVICE

Lyle A. Gilman, Sedan, Kans.

Original No. 1,960,376, dated May 29, 1934, Serial No. 641,077, November 3, 1932. Application for reissue August 15, 1935, Serial No. 36,437

6 Claims. (Cl. 94—1)

This invention relates to a device for controlling traffic, one of the objects being to provide a shutter-like structure adapted to be placed in the roadway along the line of traffic where it will normally act as a partial bar to traffic moving in the wrong direction but will shift or fold out of the way when approached by vehicles moving in the proper direction.

Another object is to provide a simple, durable and compact structure which can be installed readily and can be placed in any desired position in a roadway for the purpose of directing traffic.

A still further object is to provide a device of this character which can be utilized for counting vehicles traveling in one direction.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings

Figure 1:
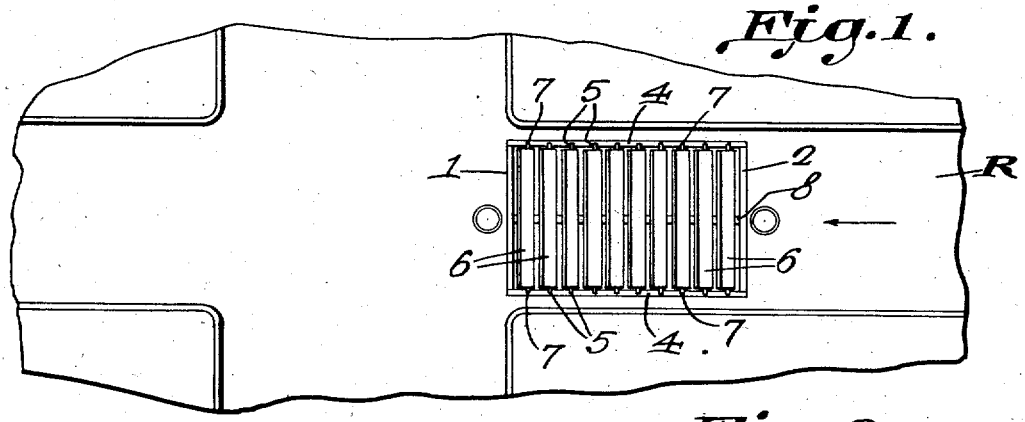
Figure 1 is a plan view of a street intersection showing the device placed for controlling one-way traffic.
Figure 2:
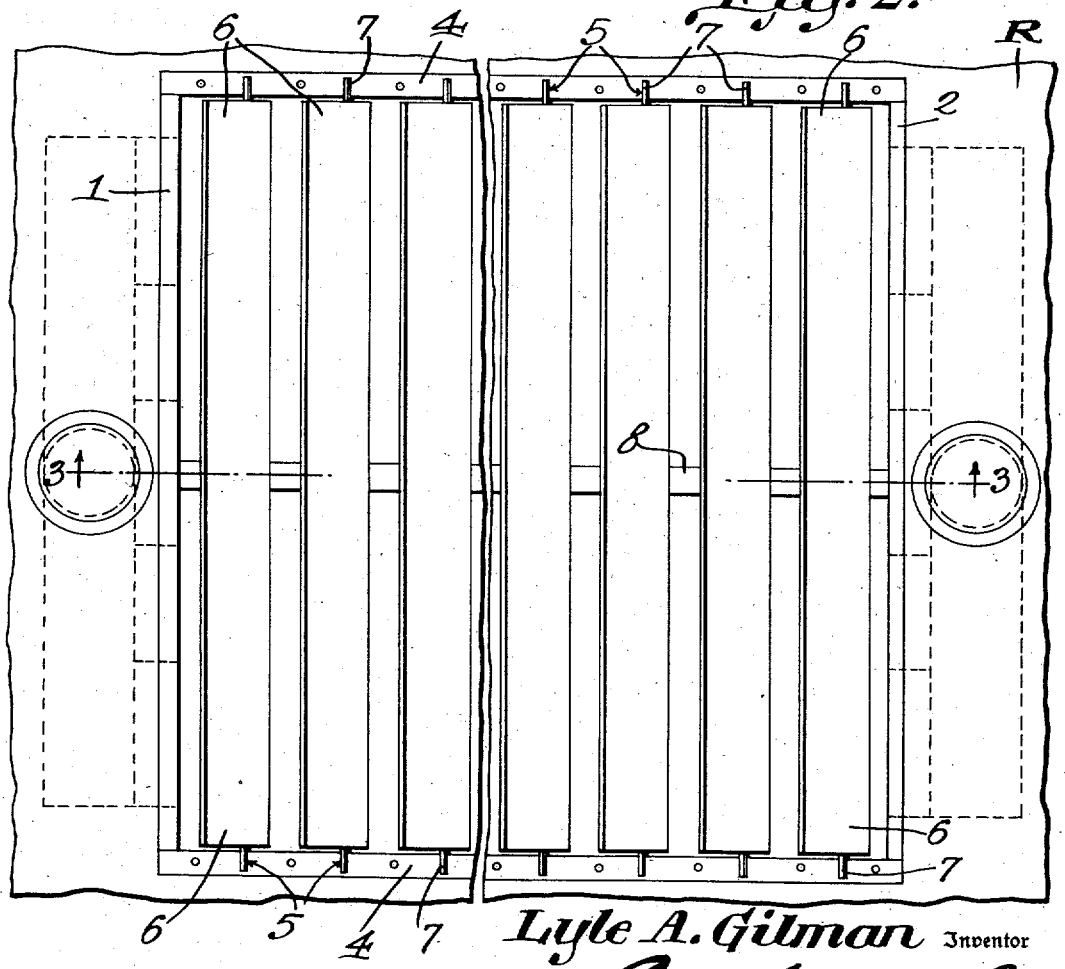
Figure 2 is an enlarged plan view of the device, portions being broken away.

Referring to the figures by characters of reference, 1 and 2 designate channeled end members connected at their ends by channeled side members 3, thereby to form a frame. Bearing strips 4 are secured on the sides 3 and have spaced recesses 5.

Supported between the sides 3 are parallel slats 6 having trunnions 7 which bear in the recesses 5. A connecting bar 8 extends under the slats and is hingedly connected to one edge of each of them, as shown at 9. One end of the bar is extended loosely in a recess or opening 10 in the end member 2 and a spring 11 connects said bar to the other end member 1. This spring is constantly under tension and pulls on the bar so as to hold it normally pressed against member 1 with the slats elevated as in Figure 3.

The frame formed by members 1, 2, and 3 is adapted to be placed substantially flush with the level of a roadway R and over a pit P suitably drained. The slats are inclined upwardly in a direction opposed to wrong traffic so that should it be approached by a vehicle traveling in the wrong direction, the wheels will come against the elevated edges of the slats and can be driven thereover only with discomfort to the driver who thus receives notice of his error.

Figure 3:
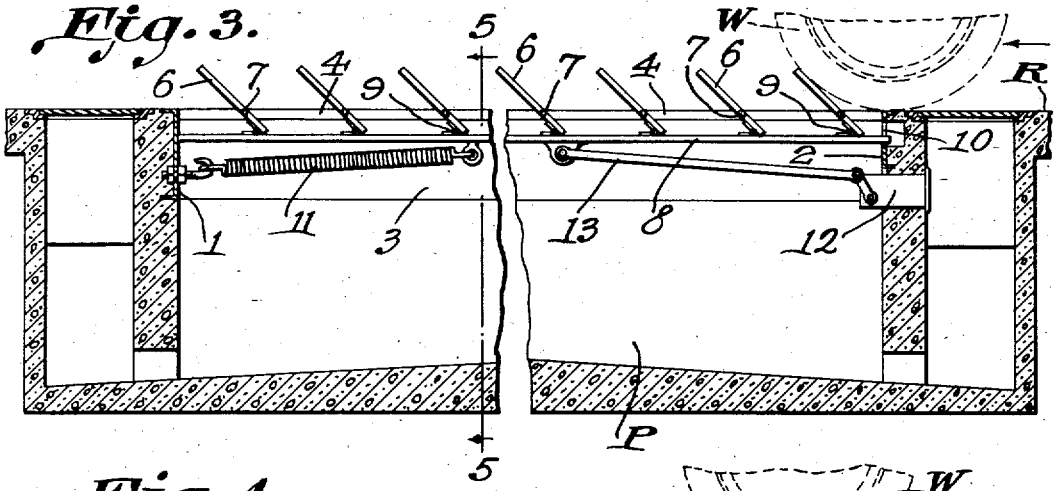
Figure 3 is a section on line 3—3, Figure 2.
Figure 4:
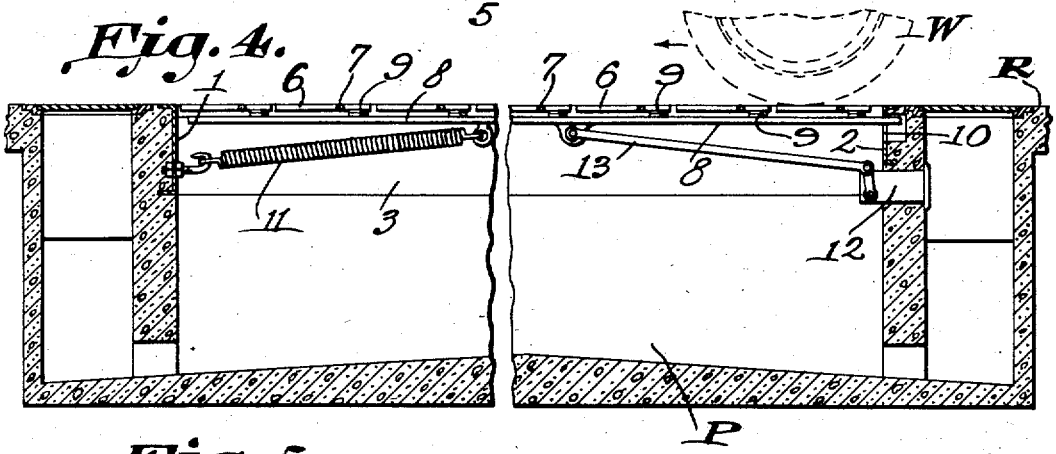
Figure 4 is a similar view showing the slats in lowered positions.
Figure 5:
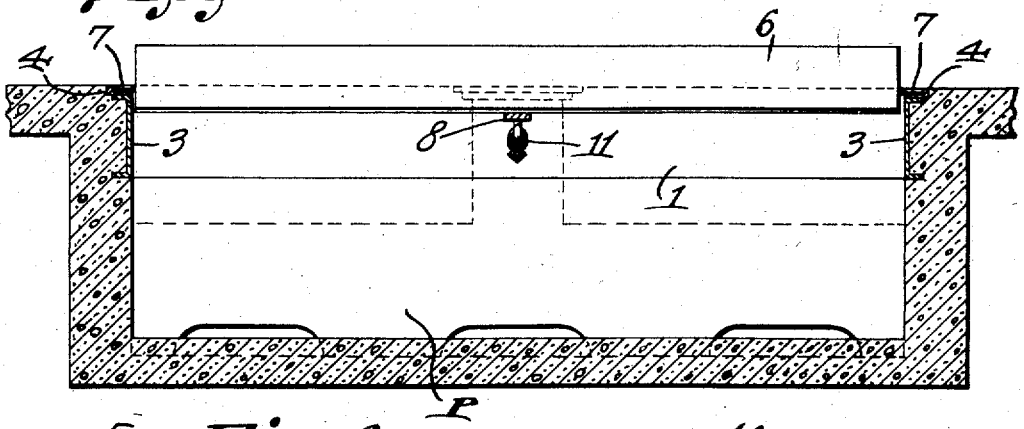
Figure 5 is a section on line 5—5, Figure 3.
Figure 6:
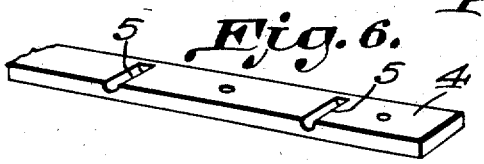
Figure 6 is a perspective view of one of the bearing strips of the slats.

A vehicle traveling in the proper direction, as indicated at W in Figures 3 and 4, will press the slats downwardly against the action of the spring 11 so that they will lie flat.

A counter 12 can be located under the device and connected by a rod 13 to bar 8 so that as the slats are lowered by passing vehicles, said vehicles will be counted.

Obviously the device can be placed in any location where the control of traffic is desired and it will be found to be very efficient in use.

What is claimed is:

1. A traffic control device including an open top structure adapted to be embedded substantially flush with the surface of a road, a plurality of transverse pivotally supported slats in the structure, a connection between the slats operated by pressure in one direction against one of the slats for swinging all of the slats in the same direction into a common plane to substantially close the open top of the structure, yieldable means for automatically swinging all of the slats into parallel upwardly inclined positions when relieved of said pressure, and means cooperating with said connection for preventing the upwardly inclined slats from swinging to closed position when subjected to pressure in the opposite direction.

2. A traffic control device including an open top structure adapted to be embedded substantially flush with the surface of a road, a plurality of transverse pivotally supported slats in the structure, a connection between the slats operated by pressure in one direction against one of the slats for swinging all of the slats in the same direction into a common plane to substantially close the open top of the structure, yieldable means for automatically swinging all of the slats into parallel upwardly inclined positions when relieved of said pressure, means cooperating with said connection for preventing the upwardly inclined slats from swinging to closed position when subjected to pressure in the opposite direction and a counter operatively connected to and actuated by the closing of the slats.

3. A traffic control device including a structure having an open top adapted to be embedded substantially flush with the surface of a road, parallel slats pivotally mounted in said structure and extending across the open top, a bar pivotally connected to all of the slats for transmitting motion thereto from any one of the slats, yieldable means for holding the slats normally inclined upwardly in parallel planes and in a direction opposed to wrong traffic, said slats and bar being shiftable by the pressure of a vehicle moving in the right direction against any one of the slats, thereby to close the slats into a common plane, and an abutment for engagement by the bar to limit the movement of the slats under the action of the yieldable means and of a vehicle moving in the wrong direction thereagainst.

4. A traffic control device including an open top structure adapted to be embedded substantially flush with the surface of a road, a plurality of transverse pivotally supported slats in the structure, a connection between the slats operated by pressure in one direction against one of the slats for swinging all of the slats in the same direction into a common plane to substantially close the open top of the structure, means for swinging all of the slats into parallel upwardly inclined positions when not subjected to said pressure, and means cooperating with said connection for preventing the upwardly inclined slats from swinging to closed position when subjected to pressure in the opposite direction.

5. A traffic control device including an open top structure adapted to be embedded substantially flush with the surface of a road, a plurality of transverse pivotally supported slats in the structure, a connection between the slats operated by pressure in one direction against one of the slats for swinging all of the slats in the same direction into a common plane to substantially close the open top of the structure, means for swinging all of the slats into parallel upwardly inclined positions when relieved of said pressure, means cooperating with said connection for preventing the upwardly inclined slats from swinging to closed position when subjected to pressure in the opposite direction and a counter operatively connected to and actuated by the closing of the slats.

6. A traffic control device including a structure having an open top adapted to be embedded substantially flush with the surface of a road, parallel slats pivotally mounted in said structure and extending across the open top, a bar pivotally connected to all of the slats for transmitting motion thereto from any one of the slats, means for moving the slats into parallel planes inclined upwardly and in a direction opposed to wrong traffic, said slats and bar being shiftable by the pressure of a vehicle moving in the right direction against any one of the slats, thereby to close the slats into a common plane, and an abutment for engagement by the bar to limit the movement of the slats under the action of the said means and of a vehicle moving in the wrong direction thereagainst.

LYLE A. GILMAN.